(12) United States Patent
Seth et al.

(10) Patent No.: US 9,817,857 B2
(45) Date of Patent: *Nov. 14, 2017

(54) DEEP CLONING OF OBJECTS USING BINARY FORMAT

(71) Applicant: Microsoft Technology Licensing, LLC, Redmond, WA (US)

(72) Inventors: Gaurav Seth, Redmond, WA (US); Jianchun Xu, Issaquah, WA (US); Koundinya Veluri, Duvall, WA (US); Geoffrey M. Kizer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,569

(22) Filed: Jan. 23, 2015

(65) Prior Publication Data

US 2015/0142854 A1 May 21, 2015

Related U.S. Application Data

(63) Continuation of application No. 13/293,734, filed on Nov. 10, 2011, now Pat. No. 8,954,475.

(51) Int. Cl.
*G06F 17/30* (2006.01)
*G06F 9/44* (2006.01)

(52) U.S. Cl.
CPC ...... *G06F 17/30342* (2013.01); *G06F 9/4435* (2013.01); *G06F 17/30* (2013.01)

(58) Field of Classification Search
CPC .. G06F 17/30038; G06F 9/4435; G06F 17/30; G06F 17/30342; G06F 9/465;

(Continued)

(56) References Cited

U.S. PATENT DOCUMENTS 5,281,558 A 1/1994 Bamji et al.
5,416,895 A * 5/1995 Anderson et al. ............ 715/209

(Continued)

OTHER PUBLICATIONS

"5.4 Session History and Navigation—HTML5", Retrieved on: Aug. 23, 2011, 26 pages, Available at: https://web.archive.org/web/20110826192553/http://www.w3.org/TR/html5/history.html.

(Continued)

*Primary Examiner* — Anh Ly
(74) *Attorney, Agent, or Firm* — Wade IP Law LLC

(57) ABSTRACT

Techniques are described herein that are capable of deep cloning (a.k.a. deep copying) objects using a binary format. A deep clone of a designated object includes references to other objects (and potentially copies of the other objects) included in the designated object. A binary representation of each object in an object graph is generated to provide a binary clone of the object graph. Objects created by a dynamic language engine are called dynamic language objects. Objects created by a host (e.g., that hosts the dynamic language engine) are called host objects. Each host object is associated with an intermediate representation thereof via a property bag that describes properties of that host object. Each intermediate representation is understandable by the dynamic language engine. A binary representation of each dynamic language object and each host object may be generated in accordance with the binary format to provide the binary clone.

28 Claims, 9 Drawing Sheets

(58) Field of Classification Search
CPC . G06F 9/541; G06F 8/00; G06F 9/547; G06F 11/1474; G06F 3/0481; G06F 9/45508; G06F 9/4433; G06F 8/42; G06F 8/447; G06F 8/437; G06F 11/3457; G06F 8/427; G06F 8/51; G06F 9/44505; G06F 9/4552; G06F 8/20; G06F 8/47; Y10S 707/99931; G06Q 30/0276; G06Q 30/0273; G06Q 30/0209; H04L 69/329; H04L 12/58; H04L 67/36
USPC .......... 707/798, 755, 811, 807, 602, 625, 707/E17.011, 741, 803, 820, 756, 707/E17.002, E17.005, E17.032, E17.014, 707/E17.055, E17.045, 736, E17.085; 717/162, 140, 100, 106, 108, 130, 131, 717/154, 115, 114, 112, 137, 116, 118, 717/125, 166, 139; 709/242, 230, 203, 709/231, 246, 217, 219, 227, 320, 315, 709/201; 715/239, 751; 719/328, 312, 719/315, 316, 317, 310, 313, 332, 330
See application file for complete search history.

(56) References Cited

U.S. PATENT DOCUMENTS

| | | | |
|---|---|---|---|
| 5,572,644 A * | 11/1996 | Liaw et al. | 715/209 |
| 5,623,591 A * | 4/1997 | Cseri | 715/762 |
| 5,872,973 A | 2/1999 | Mitchell et al. | |
| 6,226,692 B1 * | 5/2001 | Miloushev | G06F 8/36 719/316 |
| 6,301,585 B1 | 10/2001 | Milne | |
| 6,331,500 B1 | 12/2001 | Tsuji et al. | |
| 6,411,948 B1 | 6/2002 | Hetherington et al. | |
| 6,601,114 B1 | 7/2003 | Bracha et al. | |
| 6,823,504 B1 * | 11/2004 | Sokolov | G06F 9/45508 717/136 |
| 6,850,953 B1 | 2/2005 | Deshpande et al. | |
| 6,928,488 B1 * | 8/2005 | de Jong | G06F 9/4435 709/246 |
| 6,957,422 B2 | 10/2005 | Hunt | |
| 7,003,782 B2 | 2/2006 | Baldwin et al. | |
| 7,099,876 B1 | 8/2006 | Hetherington et al. | |
| 7,117,216 B2 | 10/2006 | Chakraborty et al. | |
| 7,117,504 B2 * | 10/2006 | Smith | G06F 8/20 709/201 |
| 7,165,075 B2 | 1/2007 | Harter et al. | |
| 7,219,340 B2 | 5/2007 | Schechter et al. | |
| 7,320,035 B2 | 1/2008 | Kumar et al. | |
| 7,426,721 B1 * | 9/2008 | Saulpaugh | H04L 67/16 717/143 |
| 7,462,721 B2 | 12/2008 | Jin et al. | |
| 7,493,630 B2 | 2/2009 | Hunt | |
| 7,511,718 B2 | 3/2009 | Subramanian et al. | |
| 7,685,561 B2 | 3/2010 | Deem et al. | |
| 7,725,503 B2 | 5/2010 | Doise et al. | |
| 7,814,124 B1 | 10/2010 | de Jong et al. | |
| 7,844,958 B2 | 11/2010 | Colton et al. | |
| 8,126,841 B2 | 2/2012 | Gordon et al. | |
| 8,346,788 B1 | 1/2013 | Kim et al. | |
| 8,490,117 B1 | 7/2013 | Brichford | |
| 8,516,501 B2 * | 8/2013 | Kalagananam | G06F 9/547 717/166 |
| 9,210,178 B1 * | 12/2015 | Roth | H04L 63/105 717/166 |
| 2002/0032804 A1 * | 3/2002 | Hunt | 709/320 |
| 2002/0087630 A1 | 7/2002 | Wu | |
| 2002/0092002 A1 | 7/2002 | Babaian et al. | |
| 2002/0188613 A1 * | 12/2002 | Chakraborty | G06F 7/32 707/E17.012 |
| 2002/0199190 A1 * | 12/2002 | Su | G06Q 30/0209 725/37 |
| 2003/0033212 A1 | 2/2003 | Sandhu et al. | |
| 2003/0067485 A1 * | 4/2003 | Wong | H04L 67/36 715/747 |
| 2003/0120688 A1 | 6/2003 | Hill et al. | |
| 2003/0172197 A1 | 9/2003 | Dencker et al. | |
| 2003/0188175 A1 * | 10/2003 | Volk et al. | 713/191 |
| 2004/0015516 A1 * | 1/2004 | Harter et al. | 707/104.1 |
| 2004/0042892 A1 | 3/2004 | Ruhli | |
| 2004/0049654 A1 | 3/2004 | Chrysanthakopoulos et al. | |
| 2004/0177080 A1 * | 9/2004 | Doise | G06F 8/437 717/166 |
| 2004/0244012 A1 * | 12/2004 | Massarenti | G06F 9/4435 719/319 |
| 2004/0255268 A1 * | 12/2004 | Meijer et al. | 717/106 |
| 2005/0091576 A1 * | 4/2005 | Relyea | G06F 9/4443 715/211 |
| 2005/0097146 A1 | 5/2005 | Konstantinou et al. | |
| 2005/0154978 A1 | 7/2005 | Albornoz et al. | |
| 2005/0183094 A1 * | 8/2005 | Hunt | 719/315 |
| 2005/0203958 A1 * | 9/2005 | Mitchell | G06F 9/4433 |
| 2005/0234986 A1 * | 10/2005 | Terek | G06F 17/30988 707/820 |
| 2005/0240943 A1 * | 10/2005 | Smith | G06F 9/465 719/328 |
| 2005/0246716 A1 | 11/2005 | Smith et al. | |
| 2006/0010423 A1 * | 1/2006 | Haselden | G06F 9/4428 717/116 |
| 2006/0041661 A1 | 2/2006 | Erikson et al. | |
| 2006/0059462 A1 | 3/2006 | Yamamoto | |
| 2006/0070051 A1 | 3/2006 | Kuck et al. | |
| 2006/0074732 A1 | 4/2006 | Shukla et al. | |
| 2006/0074736 A1 | 4/2006 | Shukla et al. | |
| 2006/0101446 A1 * | 5/2006 | Mariani et al. | 717/166 |
| 2006/0143227 A1 * | 6/2006 | Helm et al. | 707/103 Y |
| 2006/0150148 A1 * | 7/2006 | Beckett et al. | 717/109 |
| 2006/0253508 A1 | 11/2006 | Colton et al. | |
| 2007/0038978 A1 * | 2/2007 | Meijer | G06F 8/437 717/106 |
| 2007/0055964 A1 * | 3/2007 | Mirkazemi et al. | 717/140 |
| 2007/0159646 A1 * | 7/2007 | Adelberg et al. | 358/1.11 |
| 2007/0220138 A1 * | 9/2007 | Ganesan | H04L 67/14 709/224 |
| 2007/0239728 A1 * | 10/2007 | Smits | G06F 11/1438 714/E11.137 |
| 2007/0256055 A1 * | 11/2007 | Herscu | G06F 8/51 717/115 |
| 2007/0288644 A1 | 12/2007 | Rojas et al. | |
| 2008/0059500 A1 * | 3/2008 | Symens | 707/101 |
| 2008/0065978 A1 * | 3/2008 | Francker | G06F 8/36 715/223 |
| 2008/0098296 A1 | 4/2008 | Brichford et al. | |
| 2008/0162530 A1 * | 7/2008 | van Eikeren et al. | 707/102 |
| 2008/0222273 A1 | 9/2008 | Lakshmanan et al. | |
| 2008/0295070 A1 * | 11/2008 | Bozza et al. | 717/106 |
| 2008/0313282 A1 | 12/2008 | Warila et al. | |
| 2009/0024986 A1 | 1/2009 | Meijer et al. | |
| 2009/0083724 A1 * | 3/2009 | Eichenberger | G06F 8/447 717/160 |
| 2009/0112568 A1 * | 4/2009 | Doerfel | G06F 11/3457 703/22 |
| 2009/0150518 A1 * | 6/2009 | Lewin et al. | 709/219 |
| 2009/0162530 A1 * | 6/2009 | Nesbitt | 427/2.3 |
| 2009/0265688 A1 | 10/2009 | Govereau et al. | |
| 2009/0276795 A1 * | 11/2009 | Dyer et al. | 719/332 |
| 2009/0328001 A1 * | 12/2009 | Dubinets | G06F 8/30 717/120 |
| 2010/0005053 A1 | 1/2010 | Estes | |
| 2010/0023884 A1 | 1/2010 | Brichford et al. | |
| 2010/0079460 A1 | 4/2010 | Breeds et al. | 345/440 |
| 2010/0083277 A1 | 4/2010 | Malladi et al. | |
| 2010/0083281 A1 * | 4/2010 | Malladi | G06F 9/546 719/317 |
| 2010/0088666 A1 * | 4/2010 | Box | G06F 8/42 717/104 |
| 2010/0122241 A1 * | 5/2010 | Chatterjee | 717/140 |
| 2010/0153862 A1 * | 6/2010 | Schreiber | 715/760 |
| 2010/0262952 A1 | 10/2010 | Colton et al. | |
| 2010/0312858 A1 | 12/2010 | Mickens et al. | |

(56) References Cited

U.S. PATENT DOCUMENTS

| | | | |
|---|---|---|---|
| 2011/0138361 A1* | 6/2011 | McEntee | G06F 8/74 717/125 |
| 2011/0264666 A1* | 10/2011 | Gieseke | 707/741 |
| 2011/0264819 A1 | 10/2011 | Srinivasan et al. | |
| 2012/0117534 A1* | 5/2012 | Hershenson et al. | 717/105 |
| 2013/0007027 A1* | 1/2013 | Hazel | G06F 17/30569 707/756 |
| 2013/0007698 A1 | 1/2013 | Warila et al. | |
| 2013/0031536 A1* | 1/2013 | De | G06F 9/4552 717/146 |
| 2013/0066891 A1* | 3/2013 | Boldyrev | G06F 17/30038 707/755 |
| 2013/0124573 A1 | 5/2013 | Seth et al. | |
| 2013/0166507 A1 | 6/2013 | Staczek | |
| 2013/0290249 A1* | 10/2013 | Merriman et al. | 707/610 |
| 2015/0121338 A1* | 4/2015 | Senster | G06F 8/47 717/120 |

OTHER PUBLICATIONS

Carr, Richard, "Deep Cloning Using Binary Serialization", Published on: Jun. 4, 2010, 2 pages, Available at: http://www.blackwasp.co.uk/DeepClone.aspx.

"Flexjson", Retrieved on: Aug. 23, 2011, 31 pages, Available at: http://flexjson.sourceforge.net.

"HTML5—Structured Cloning Algorithm (SCA)", Published on: Aug. 23, 2011, 740 pages, Available at: https://web.archive.org/web/20110824084257/http://dev.w3.org/html5/spec/Overview.html.

"Indexed Database API", Retrieved on: Aug. 23, 2011, 83 pages, Available at: https://web.archive.org/web/20110904045141/http://www.w3.org/TR/IndexedDB/.

"Javatechnques", Published on: Nov. 8, 2003, 4 pages, Available at: http://javatechniques.com/blog/2003/11/08/speeding-up-deep-copies/.

".NET for Java Developers Migrating to C#", Retrieved on: Aug. 12, 2011, 9 pages, Available at: http://book.javanb.com/NET-For-Java-Developers-Migrating-To-Csharp/0672324024_ch15lev1sec8.html.

"Web Workers", Retrieved on: Aug. 23, 2011, 26 pages, Available at: https://web.archive.org/web/20110822194144/http://www.w3.org/TR/workers/.

Zeider, Brandon, ".NET FAQ—Deep Copy with Binary Serialization", Published on: Jun. 18, 2011, 2 pages, Available at: http://web-archive-me.com/page/2064490/2013-05-11/http://brandonzeider.me/2011/net-faq/deep-copy-with-binary-serialization/.

Gligoric, et al., "Optimizing Generation of Object Graphs in Java PathFinder", In Proceedings of the International Conference on Date of Conference Software Testing Verification and Validation, Apr. 2009, pp. 51-60.

Kumar, Santosh, "Deep Copy in JavaScript" Published on: Jul. 21, 2008, 8 pages, Available at: http://blog.imaginea.com/deep-copy-in-javascript/.

Lammel, et al., "Strategic programming meets adaptive programming", In Proceedings of the 2nd International Conference on Aspect-oriented Software Development, Mar. 2003, pp. 168-177.

Udi, Dahan, "Optimizing a Large Scale Software+ Services Application", Published on: Apr. 2009, 10 pages, Available at: http://msdn.microsoft.com/en-us/magazine/dd569749.aspx.

"Non-Final Office Action Issued in U.S. Appl. No. 13/293,734", dated May 14, 2013, 16 Pages.

"Non-Final Office Action Issued in U.S. Appl. No. 13/290,734", dated Dec. 6, 2012, 17 Pages.

"Non-Final Office Action Issued in U.S. Appl. No. 13/293,734", dated May 1, 2014, 18 Pages.

"Non-Final Office Action Issued in U.S. Appl. No. 13/293,734", dated Oct. 30, 2013, 19 Pages.

"Notice of Allowance Issued in U.S. Appl. No. 13/293,734", dated Oct. 2, 2014, 9 Pages.

* cited by examiner

DEEP CLONING OF OBJECTS USING BINARY FORMAT

CROSS-REFERENCE TO RELATED APPLICATION(S)

This application is a continuation of U.S. patent application Ser. No. 13/293,734, filed Nov. 10, 2011, the entirety of which is incorporated by reference herein.

BACKGROUND

In modern data systems, data typically is structured and serialized before being transmitted over network connections (e.g., between servers and web applications). Serialization is a process of converting a data structure (a.k.a. object) or object state into a format that is capable of being stored and subsequently recreated. For instance, the resulting serialized data can be used to create a semantically identical clone of the original object.

A variety of formats has been proposed for structuring data and serializing objects. However, each such format has its limitations. One commonly-used format for structuring data and serializing objects is known as JavaScript Object Notation (JSON). The limitations of JSON are common among many of the other formats that have been proposed. One example of such a limitation is that JSON does not allow serialization of host objects. While unsupported data types may be converted and represented as some other data format, a universally recognized conversion algorithm typically does not exist. Accordingly, the sender of the data and the receiver of the data often coordinate to determine how such a conversion is to occur. Moreover, JSON is not capable of making a deep copy of an object. Rather, JSON makes shallow copies of objects. A deep copy of an object is a copy that includes references to other objects that are included in the original object. The deep clone may further include copies of the objects that are included in the original object. A shallow copy of an object is a copy that includes copies of other objects (but not references to the other objects) that are included in the original object. Furthermore, JSON does not track such references.

SUMMARY

Various approaches are described herein for, among other things, deep cloning (a.k.a. deep copying) objects using a binary format. A deep clone of a designated object includes references to other objects that are included in the designated object. The deep clone may further include copies of the objects that are included in the designated object. Accordingly, the deep clone may facilitate maintenance of copies and references to other objects, including those potentially present in an object graph that includes the designated object. Whereas, a shallow copy of the designated object includes copies of other objects (but not references to the other objects) that are included in the designated object. As mentioned above, the objects to be cloned may be included in an object graph. A binary representation of each object in the object graph is generated to provide a binary clone of the object graph. For example, a host may execute on a device (e.g., a computer) and host a dynamic language engine. Objects that are created by the dynamic language engine are referred to as dynamic language objects. Objects that are created by the host are referred to as host objects. Each host object is associated with a property bag that contains an intermediate representation of that host object. For instance, each intermediate representation may describe properties of the corresponding host object. In accordance with this example, a binary representation of each dynamic language object and each host object may be generated in accordance with the binary format to provide the binary clone.

A method of deep cloning object(s) in an object graph using a binary format is described. In accordance with this method, a determination is made whether each of the object(s) in the object graph is a host object that is created by a host or a dynamic language object that is created by a dynamic language engine hosted by the host. Each dynamic language object that is included in the object(s) is retrieved from the dynamic language engine. Each host object that is included in the object(s) is retrieved from the host via an intermediate representation of that host object contained in a property bag. A binary representation of each dynamic language object and each host object is generated in accordance with the binary format to provide a binary clone of the object graph.

A method of reconstructing an object graph based on a binary clone of the object graph is described. The binary clone includes binary representation(s) of respective host object(s). In accordance with this method, a placeholder is created for each of the respective host object(s). Each of the binary representation(s) is extracted from the binary clone into a respective property bag object such that the respective property bag object includes properties of the host object. The properties from each property bag object are extracted. Each placeholder is initialized with the properties that are extracted from the respective property bag object to provide a respective initialized host object in a reconstructed object graph.

A system to deep clone object(s) in an object graph using a binary format is described. The system includes a host and a serialization engine. The host is configured to host a dynamic language engine. The serialization engine is included in the dynamic language engine. The serialization engine includes an object module, a retrieval module, and a binary module. The object module is configured to determine whether each of the object(s) in the object graph is a host object that is created by the host or a dynamic language object that is created by the dynamic language engine. The retrieval module is configured to retrieve each dynamic language object that is included in the object(s) from the dynamic language engine. The retrieval module is further configured to retrieve each host object that is included in the object(s) from the host via an intermediate representation of that host object contained in a property bag. The binary module is configured to generate a binary representation of each dynamic language object and each host object in accordance with the binary format to provide a binary clone of the object graph.

A system to reconstruct an object graph based on a binary clone of the object graph is described. The binary clone includes binary representation(s) of respective host object(s). The system includes a host, which creates a placeholder for each of the host object(s). The system further includes a dynamic language engine, which is hosted by the host. The dynamic language engine includes a de-serialization engine that extracts each of the binary representation(s) from the binary clone into a respective property bag object such that the respective property bag object includes properties of the host object. The host extracts the properties from each of the property bag objects. The host initializes each placeholder with the properties that are extracted from the respective property bag object to provide a respective initialized host object in a reconstructed object graph.

A computer program product is described that includes a computer-readable medium having computer program logic recorded thereon for enabling a processor-based system to deep clone object(s) in an object graph using a binary format. The computer program product includes first, second, third, and fourth program logic modules. The first program logic module is for enabling the processor-based system to determine whether each of the object(s) in the object graph is a host object that is created by a host or a dynamic language object that is created by a dynamic language engine hosted by the host. The second program logic module is for enabling the processor-based system to retrieve each dynamic language object that is included in the object(s) from the dynamic language engine. The third program logic module is for enabling the processor-based system to retrieve each host object that is included in the object(s) from the host via an intermediate representation of that host object contained in a property bag. The fourth program logic module is for enabling the processor-based system to generate a binary representation of each dynamic language object and each host object in accordance with the binary format to provide a binary clone of the object graph.

A computer program product is described that includes a computer-readable medium having computer program logic recorded thereon for enabling a processor-based system to reconstruct an object graph based on a binary clone of the object graph. The binary clone includes binary representation(s) of respective host object(s). The computer program product includes first, second, third, and fourth program logic modules. The first program logic module is for enabling the processor-based system to create a placeholder for each of the objects. The second program logic module is for enabling the processor-based system to extract each of the binary representation(s) from the binary clone into a respective property bag object such that the respective property bag object includes properties of the host object. The third program logic module is for enabling the processor-based system to extract the properties from each of the property bag objects. The fourth program logic module is for enabling the processor-based system to initialize each placeholder with the properties that are extracted from the respective property bag object to provide a respective initialized host object in a reconstructed object graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
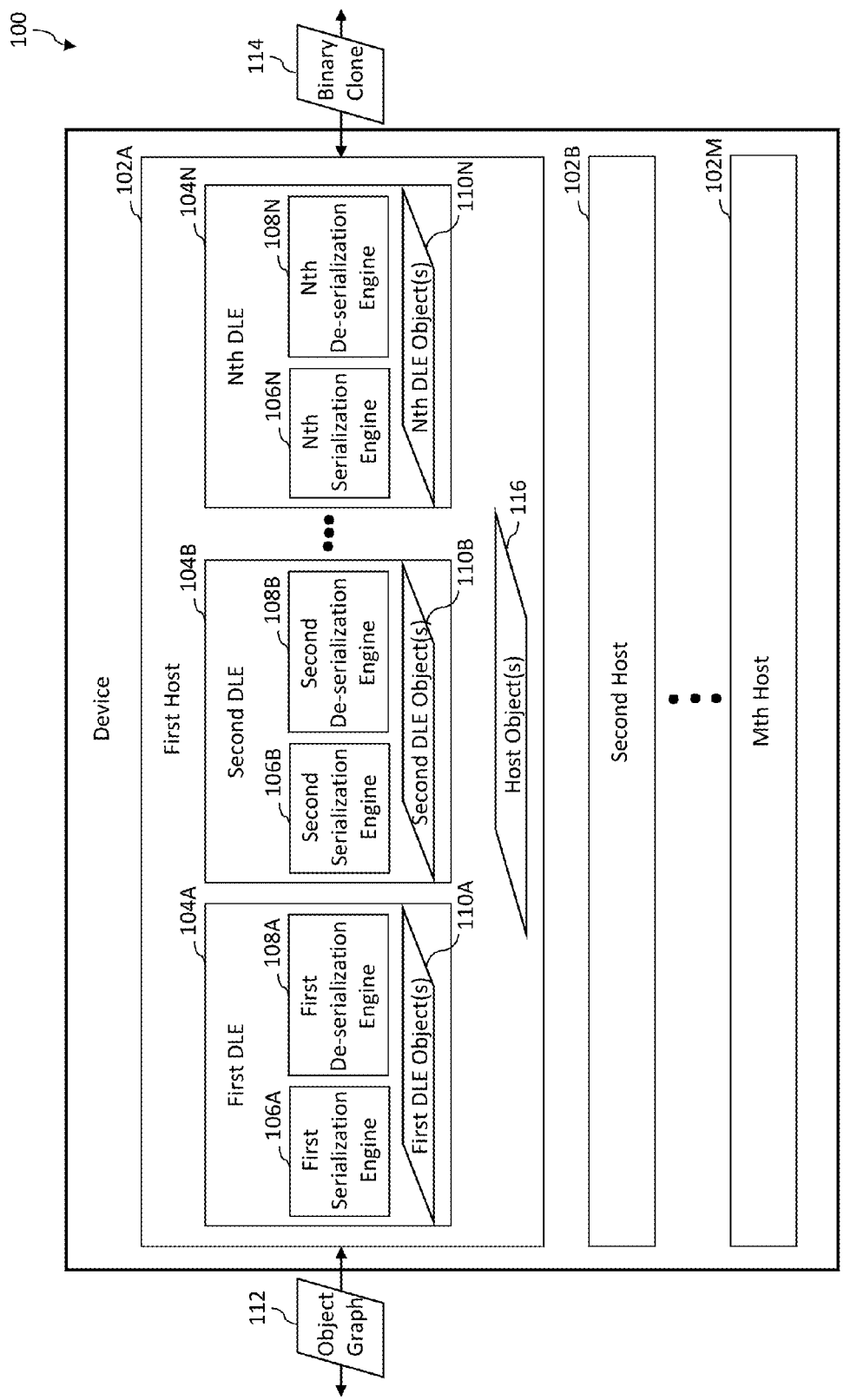
FIG. 1 is a block diagram of an example device in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of deep cloning (a.k.a. deep copying) objects using a binary format. A deep clone of a designated object includes references to other objects that are included in the designated object. The deep clone may further include copies of the objects that are included in the original object. Accordingly, the deep clone may facilitate maintenance of copies and references to other objects, including those potentially present in an object graph that includes the designated object. Whereas, a shallow copy of the designated object includes copies of other objects (but not references to the other objects) that are included in the designated object. As mentioned above, the objects to be cloned may be included in an object graph. The example embodiments are capable of generating a binary representation of each object in the object graph to provide a binary clone of the object graph. In accordance with some example embodiments, a host executes on a device (e.g., a computer) and hosts a dynamic language engine. Objects that are created by the dynamic language engine are referred to as dynamic language objects.

Objects that are created by the host are referred to as host objects. Each host object is associated with a property bag that contains an intermediate representation of that host object. For instance, each intermediate representation may describe properties of the corresponding host object. In these embodiments, a binary representation of each dynamic language object and each property bag is generated in accordance with the binary format to provide the binary clone.

Example techniques described herein have a variety of benefits as compared to conventional serialization techniques. For example, the binary format that is utilized by the example techniques may enable substantial optimization for runtime and/or memory performance. In accordance with this example, using a binary format and abstracting the serialization engine and/or the de-serialization engine for both dynamic language objects and host objects in the dynamic language engine may enable various performance optimizations, including but not limited to optimizing for scenarios in which cloned data need not be persisted and/or optimizing based on source and target contexts that are serializing and de-serializing the data within (1) the same script context, (2) the same thread context, and/or (3) the same process. A script context is a single dynamic language engine running on a thread. A thread context is a single thread having one or more dynamic language engines running thereon. A process is a single process containing one or more threads, each thread having at least one respective dynamic language engine running thereon. A thread is a smallest unit of processing that is capable of being scheduled by an operating system. These optimizations may reduce a likelihood that two references and copies of the binary data are maintained, one in the serializing context and one in the de-serializing context, by direct cloning of the object in a memory recycler of the target context, and just keeping object reference information in the binary format.

The example techniques may be extensible to various deep copying requirements for dynamic objects across hosts. The binary representations of the dynamic language objects and the property bags may be used in processes that do not support dynamic language objects. The example techniques may be capable of maintaining identity of objects that are cloned. The example techniques may provide relatively quick look-ups into the serialized data, as compared to conventional techniques. Application programming interfaces (APIs) may be exposed to humans (e.g., software developers) to allow the humans to access the deep cloning functionality of the example embodiments. In some example techniques, binary representations of host objects and native dynamic language objects (e.g., native ECMAScript® objects) may appear in the same object layout format in the binary clone. Accordingly, a de-serialization engine may be capable of processing the host objects in the same way as the native dynamic language objects.

In some example techniques, a host may be configured to determine whether each host object is to be serialized and/or de-serialized synchronously or asynchronously. If the host determines that a host object is to be serialized and/or de-serialized synchronously, the host and a dynamic language engine that is hosted by the host perform respective aspects of the serialization and/or de-serialization synchronously. If the host determines that a host object is to be serialized and/or de-serialized asynchronously, the host performs some aspects of the serialization and/or de-serialization asynchronously, and a dynamic language engine that is hosted by the host may perform other aspects of the serialization and/or de-serialization synchronously or asynchronously. In other example techniques, a dynamic language engine may be configured to determine whether a host is to serialize and/or de-serialize each host object synchronously or asynchronously. The dynamic language engine may instruct the host to serialize and/or de-serialize each host object in accordance with such a determination. In other example techniques, a dynamic language engine may be configured to determine whether each dynamic language object is to be serialized and/or de-serialized synchronously or asynchronously. The dynamic language engine may then serialize and/or de-serialize the dynamic language object accordingly.

FIG. 1 is a block diagram of an example device 100 in accordance with an embodiment. Device 100 is a processing system that is capable of deep cloning (a.k.a. deep copying) objects using a binary format. An example of a processing system is a system that includes at least one processor that is capable of manipulating data in accordance with a set of instructions. For instance, a processing system may be a computer (e.g., a desktop computer, a laptop computer, a tablet computer, etc.), a personal digital assistant, a cellular telephone, etc. Although device 100 is described herein as being a processing system, it will be recognized that device 100 may be implemented as a virtual machine.

Generally speaking, device 100 operates to deep clone object(s) in an object graph 112 using a binary format to provide a binary clone 114 of the object graph 112. The binary clone 114 includes binary representation(s) of the respective object(s). The binary representation(s) are configured in accordance with the binary format. Device 100 includes a plurality of hosts 102A-102M. Examples of a host include but are not limited to an operating system, a browser, etc. Examples of an operating system include but are not limited to Berkeley Software Distribution™ (BSD), developed and distributed by the Computer Systems Research Group (CSRG) of the University of California, Berkeley, or descendants thereof; Linux developed and distributed under the GNU Project; Mac OS® developed and distributed by Apple Inc., Microsoft Windows® developed and distributed by Microsoft Corporation; and UNIX™ developed and distributed by AT&T. Examples of a browser include but are not limited to Internet Explorer®, developed and distributed by Microsoft Corporation; Firefox®, developed and distributed by Mozilla Foundation; Google® Chrome™, developed and distributed by Google Inc.; Safari™, developed and distributed by Apple Inc.; and Opera™, developed and distributed by Opera Software ASA. Each of the hosts 102A-102M is capable of hosting one or more dynamic language engines (DLEs). Device 100 is shown to include a plurality of hosts 102A-102M for illustrative purposes and is not intended to be limiting. For instance, M may be any integer, including 1, 2, 3, etc. Accordingly, device 100 may include a single host, such as host 102A.

First host 102A includes host object(s) 116, which are created by first host 102A. First host 102A further includes a plurality of dynamic language engines (DLEs) 104A-104N. It will be recognized that first host 102A is shown to include a plurality of dynamic language engines (DLEs) 104A-104N for illustrative purposes and is not intended to be limiting. For example, N may be any integer, including 1, 2, 3, etc. Accordingly, first host 102A may include a single DLE, such as first DLE 104A. It will be further recognized that any one or more of the hosts 102A-102M may include host object(s) created by the respective host and/or any one or more of the plurality of DLEs 104A-104N.

Each of the DLEs 104A-104N is capable of including a serialization engine and/or a de-serialization engine to perform respective serialization and/or de-serialization techniques, as described in further detail below with reference to FIGS. 2-8. For instance, first DLE 104A is shown to include first serialization engine 106A and first de-serialization engine 108A; second DLE 104B is shown to include second serialization engine 106B and second de-serialization engine 108B, and so on. Each of the serialization engines 106A-106N is configured to serialize data structures to provide binary representations of those data structures. For instance, each of the serialization engines 106A-106N is capable of serializing the object graph 112 to provide the binary clone 114. Each of the de-serialization engines 108A-108N is configured to de-serialize the binary representations of the data structures to provide non-binary representations of the data structures. For instance, each of the de-serialization engines 108A-108N is capable of de-serializing the binary clone 114 to provide the object graph 112. Examples of a non-binary representation include but are not limited to an ECMAScript® (e.g., JavaScript®) representation, an extensible markup language (XML) representation, etc. An ECMAScript® representation is a representation that is configured in accordance with (e.g., written in) an ECMAScript® programming language. An XML representation is a representation that is configured in accordance with an XML programming language. The plurality of DLEs 104A-104N further includes a plurality of respective DLE objects 110A-110N. The first DLE object(s) 110A are created by first DLE 104A; the second DLE object(s) 110B are created by second DLE 104B, and so on.

Each of the serialization engines 106A-106N and each of the de-serialization engines 108A-108N may be implemented in various ways to respectively serialize and de-serialize objects, including being implemented in hardware, software, firmware, or any combination thereof. For example, any one or more of the serialization engines 106A-106N and/or any one or more of the de-serialization engines 108A-108N may be implemented as computer program code configured to be executed in one or more processors. In another example, any one or more of the serialization engines 106A-106N and/or any one or more of the de-serialization engines 108A-108N may be implemented as hardware logic/electrical circuitry. In an embodiment, any one or more of the serialization engines 106A-106N and/or any one or more of the de-serialization engines 108A-108N may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
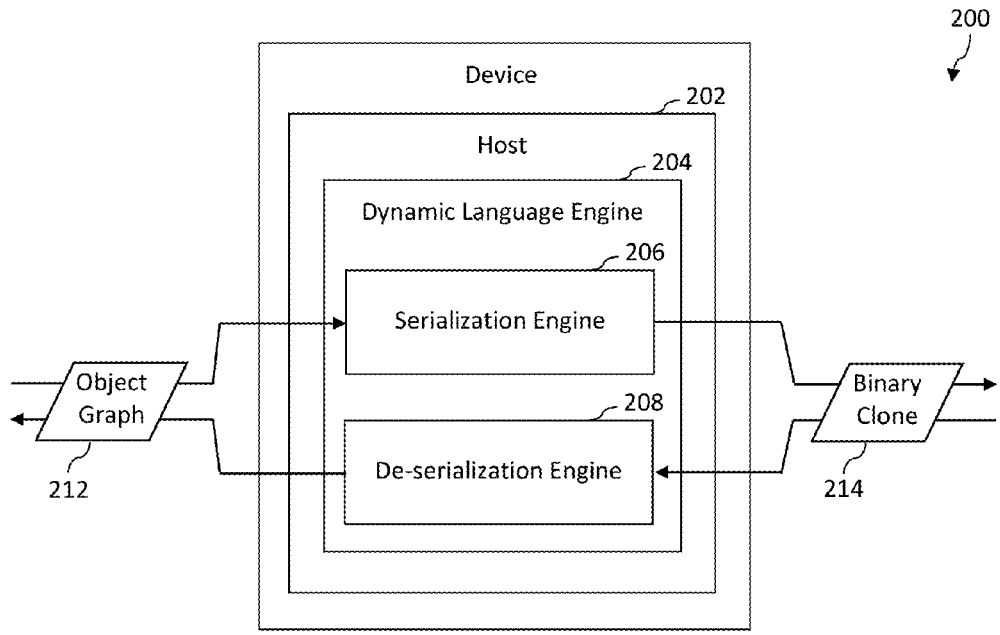
FIGS. 2-5 and 8 are block diagrams of example implementations of the device shown in FIG. 1 in accordance with an embodiment.
Figure 3:
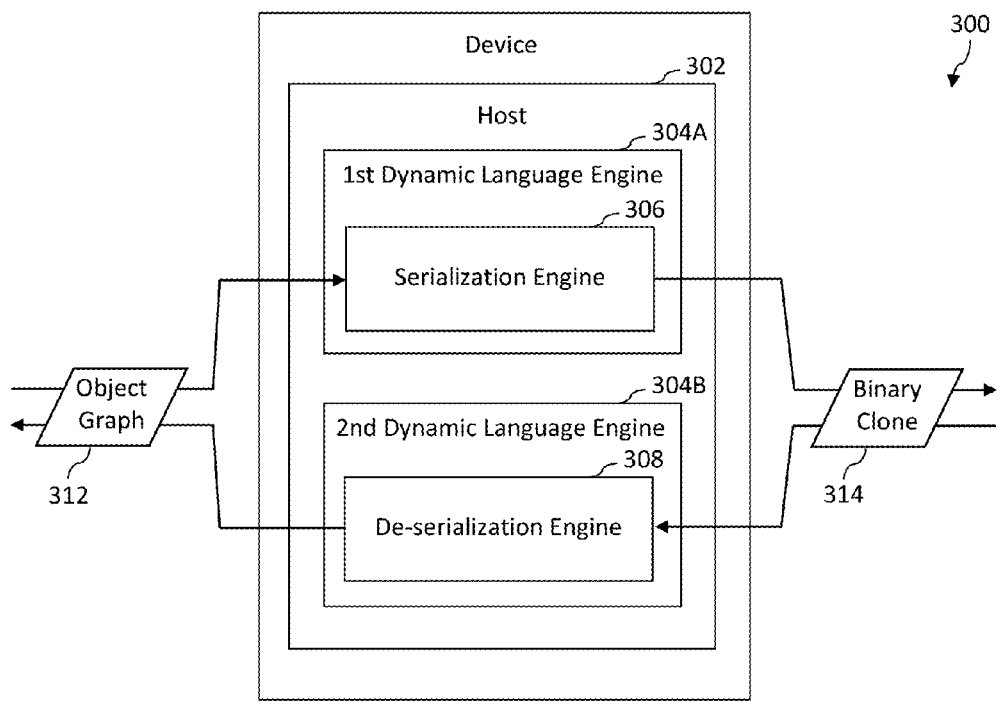
Figure 4:
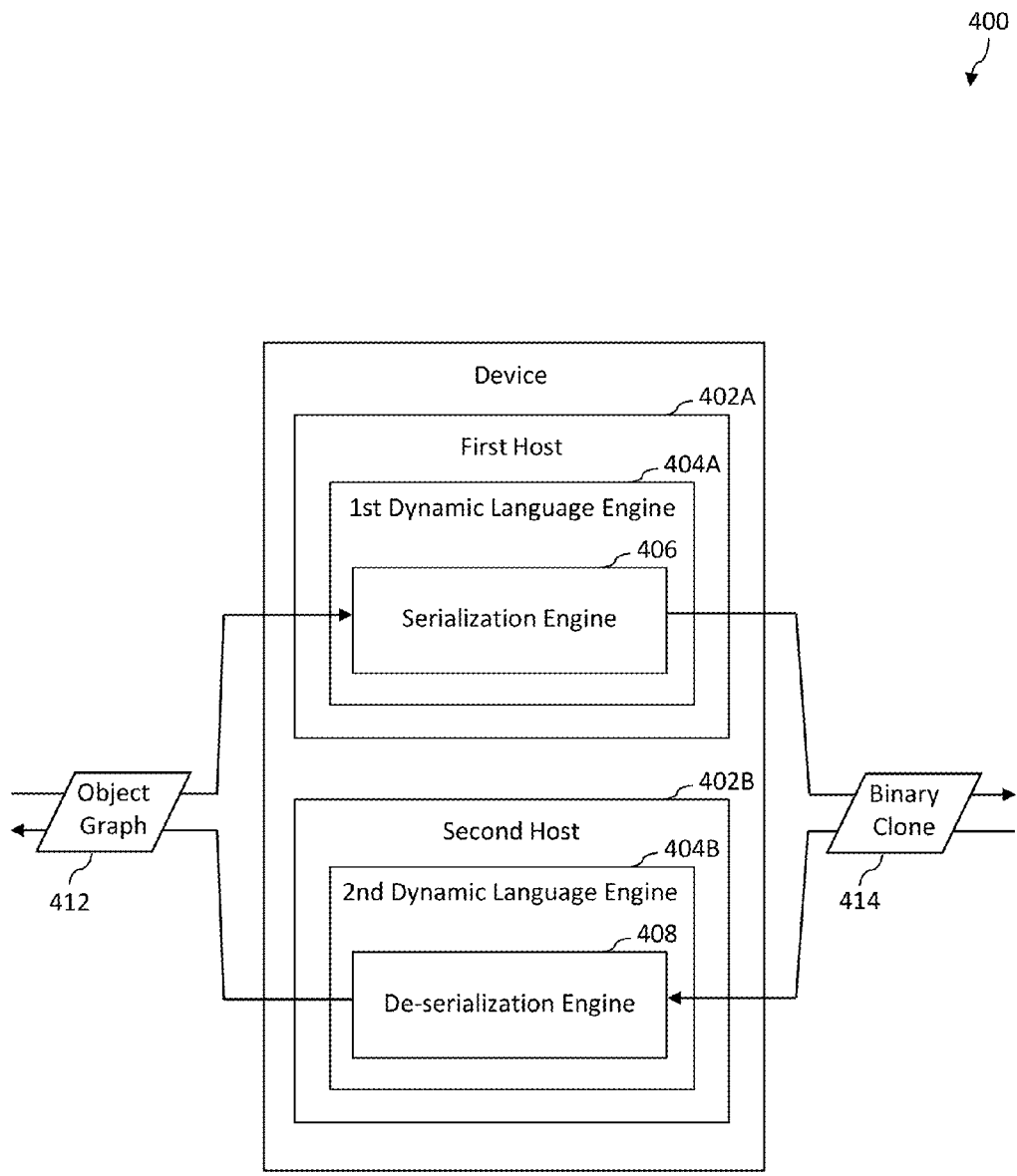

FIGS. 2-4 are block diagrams of devices 200, 300, and 400, which are example implementations of device 100 shown in FIG. 1, in accordance with embodiments. In particular, FIGS. 2-4 show various ways in which a serialization engine (e.g., any of serialization engines 106A-106N) and a de-serialization engine (e.g., any of de-serialization engines 108A-108N) may be implemented with respect to a device.

As shown in FIG. 2, device 200 executes a host 202. Host 202 hosts a dynamic language engine 204. Dynamic language engine 204 includes a serialization engine 206 and a de-serialization engine 208. Serialization engine 206 is configured to serialize object(s) that are included in an object graph 212 in accordance with a binary format to provide binary representation(s) of the respective object(s) in a binary clone 214 of the object graph 212. De-serialization engine 208 is configured to de-serialize binary representation(s) of respective object(s) in the binary clone 214 to provide the object(s) having a non-binary format in the object graph 212.

As shown in FIG. 3, device 300 executes a host 302, which hosts first and second dynamic language engines 304A and 304B. First dynamic language engine 304A includes a serialization engine 306, which is configured to serialize object(s) that are included in an object graph 312 in accordance with a binary format to provide binary representation(s) of the respective object(s) in a binary clone 314 of the object graph 312. Second dynamic language engine 304B includes a de-serialization engine 308, which is configured to de-serialize binary representation(s) of respective object(s) in the binary clone 314 to provide the object(s) having a non-binary format in the object graph 312.

As shown in FIG. 4, device 400 executes a first host 402A and a second host 402B. First host 402A hosts a first dynamic language engine 404A, which includes a serialization engine 406. Second host 402B hosts a second dynamic language engine 404B, which includes a de-serialization engine 408. Serialization engine 406 is configured to serialize object(s) that are included in an object graph 412 in accordance with a binary format to provide binary representation(s) of the respective object(s) in a binary clone 414 of the object graph 412. De-serialization engine 408 is configured to de-serialize binary representation(s) of respective object(s) in the binary clone 414 to provide the object(s) having a non-binary format in the object graph 412.

Figure 5:
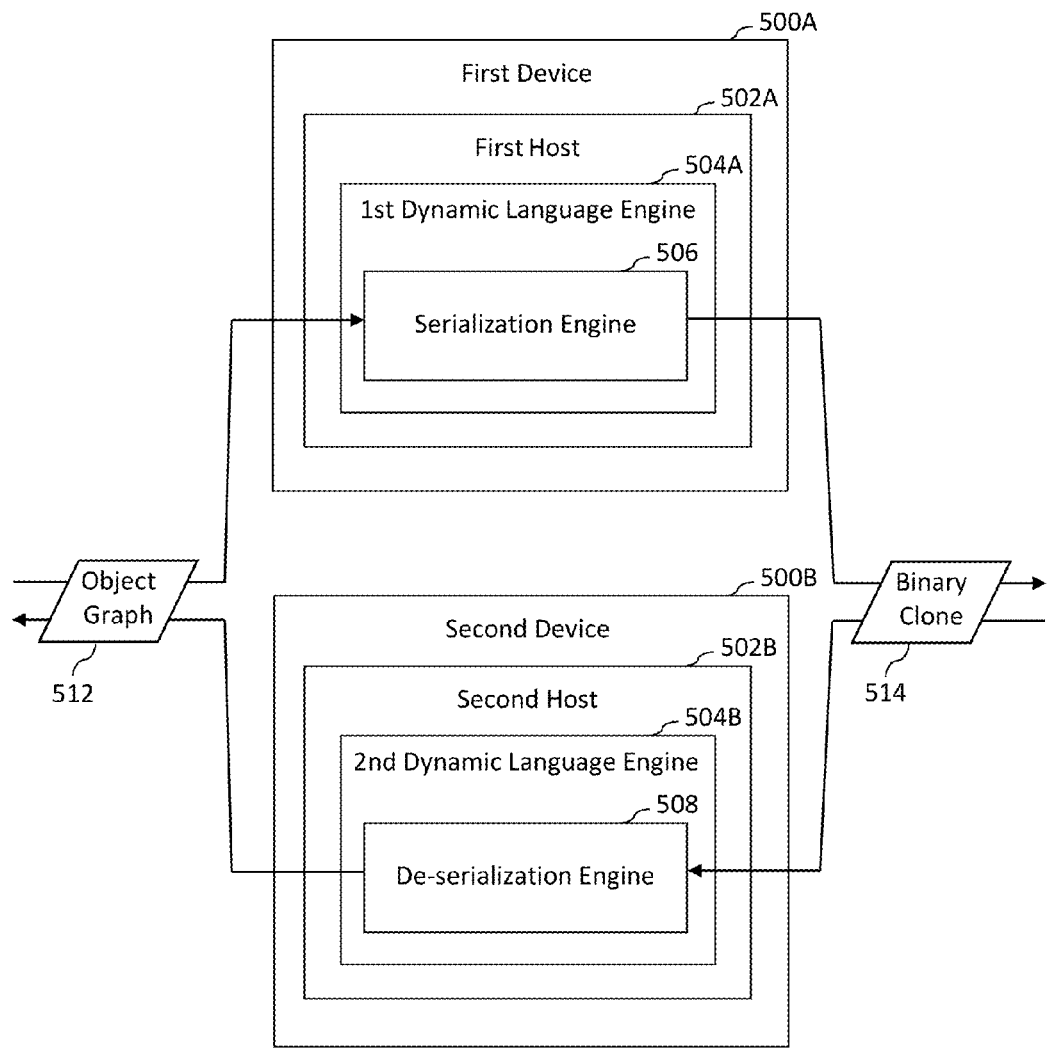

As shown in FIG. 5, first device 500A executes a first host 502A. First host 502A hosts a first dynamic language engine 504A, which includes a serialization engine 506. Serialization engine 506 is configured to serialize object(s) that are included in an object graph 512 in accordance with a binary format to provide binary representation(s) of the respective object(s) in a binary clone 514 of the object graph 512. Second device 500B executes a second host 502B. Second host 502B hosts a second dynamic language engine 504B, which includes a de-serialization engine 508. De-serialization engine 508 is configured to de-serialize binary representation(s) of respective object(s) in the binary clone 514 to provide the object(s) having a non-binary format in the object graph 512.

Each of FIGS. 3, 4, and 5 shows a serialization engine 306, 406, or 506 included in a first dynamic language engine 304A, 404A, or 504A and a de-serialization engine 308, 408, or 508 included in a second dynamic language engine 304B, 404B, or 504B. It will be recognized that the first dynamic language engine 304A, 404A, or 504A may be configured to execute commands written in a first dynamic language, and the second dynamic language engine 304B, 404B, or 504B may be configured to execute commands written in a second dynamic language that is different from the first dynamic language, though the scope of the example embodiments is not limited in this respect. For example, the first dynamic language engine 304A, 404A, or 504A may not be capable of executing commands written in the second dynamic language. In another example, the second dynamic language engine 304B, 404B, or 504B may not be capable of executing commands written in the first dynamic language.

Figure 6A:
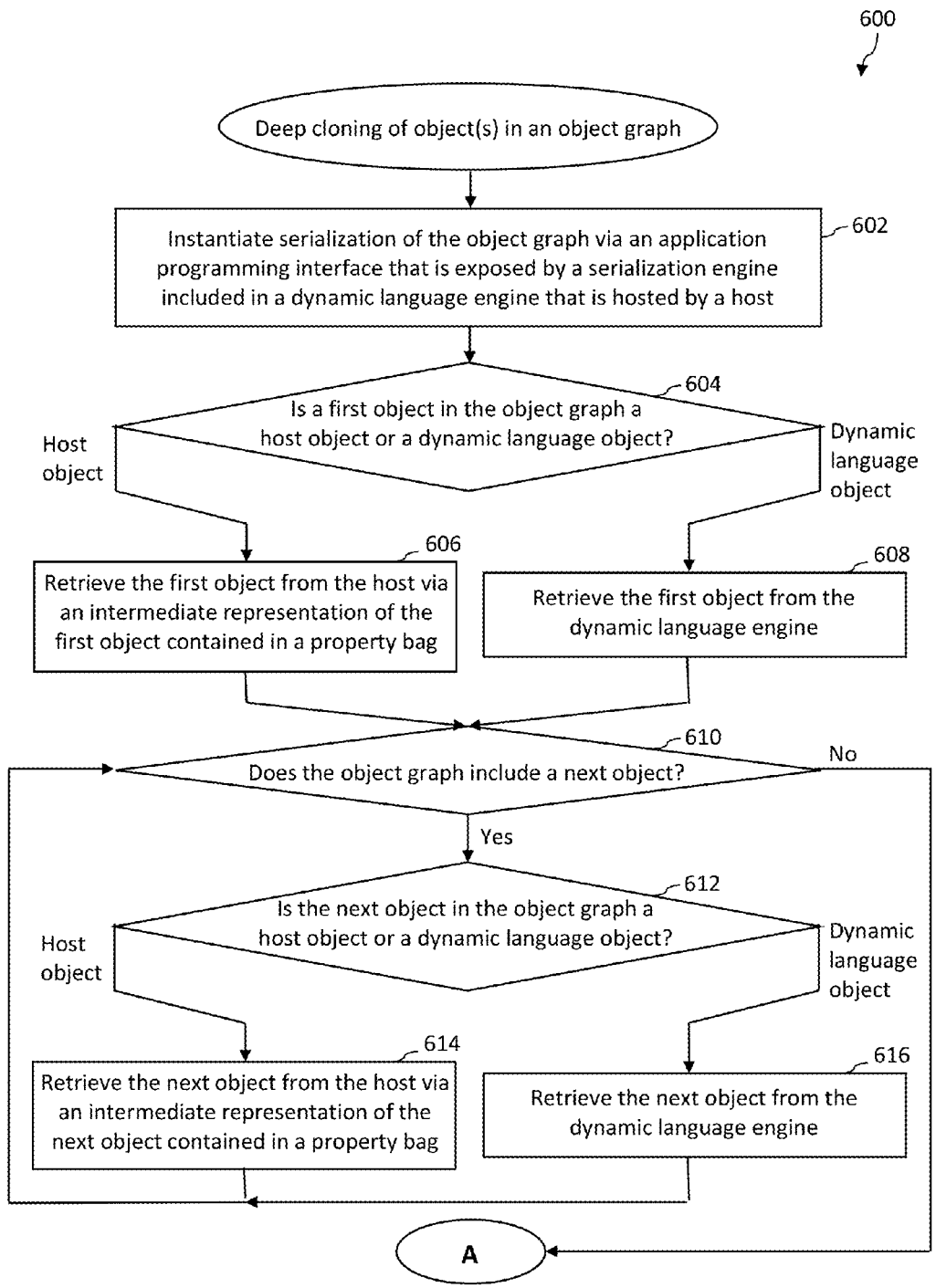
FIGS. 6A and 6B depict respective portions of a flowchart of an example method for deep cloning of objects in accordance with an embodiment.
Figure 6B:
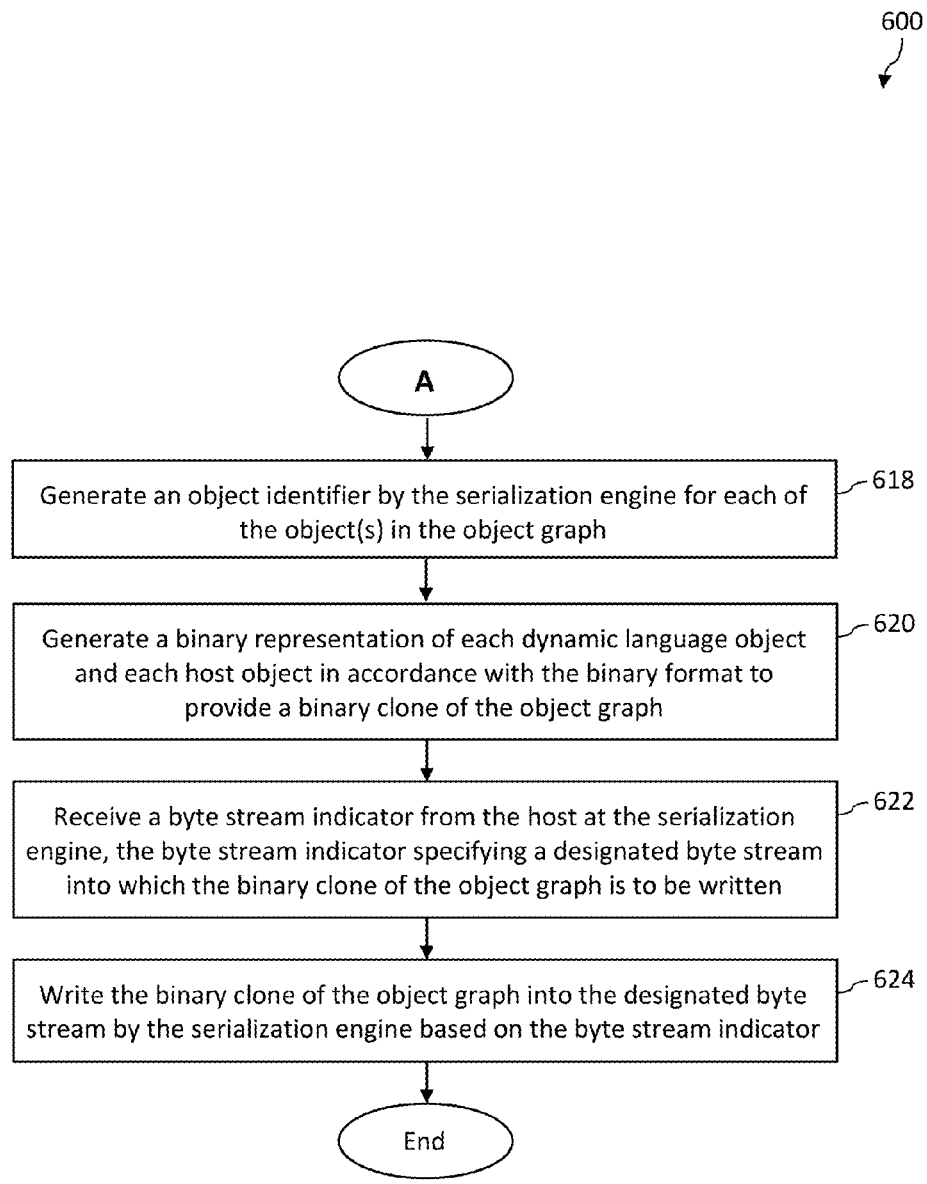
Figure 7:
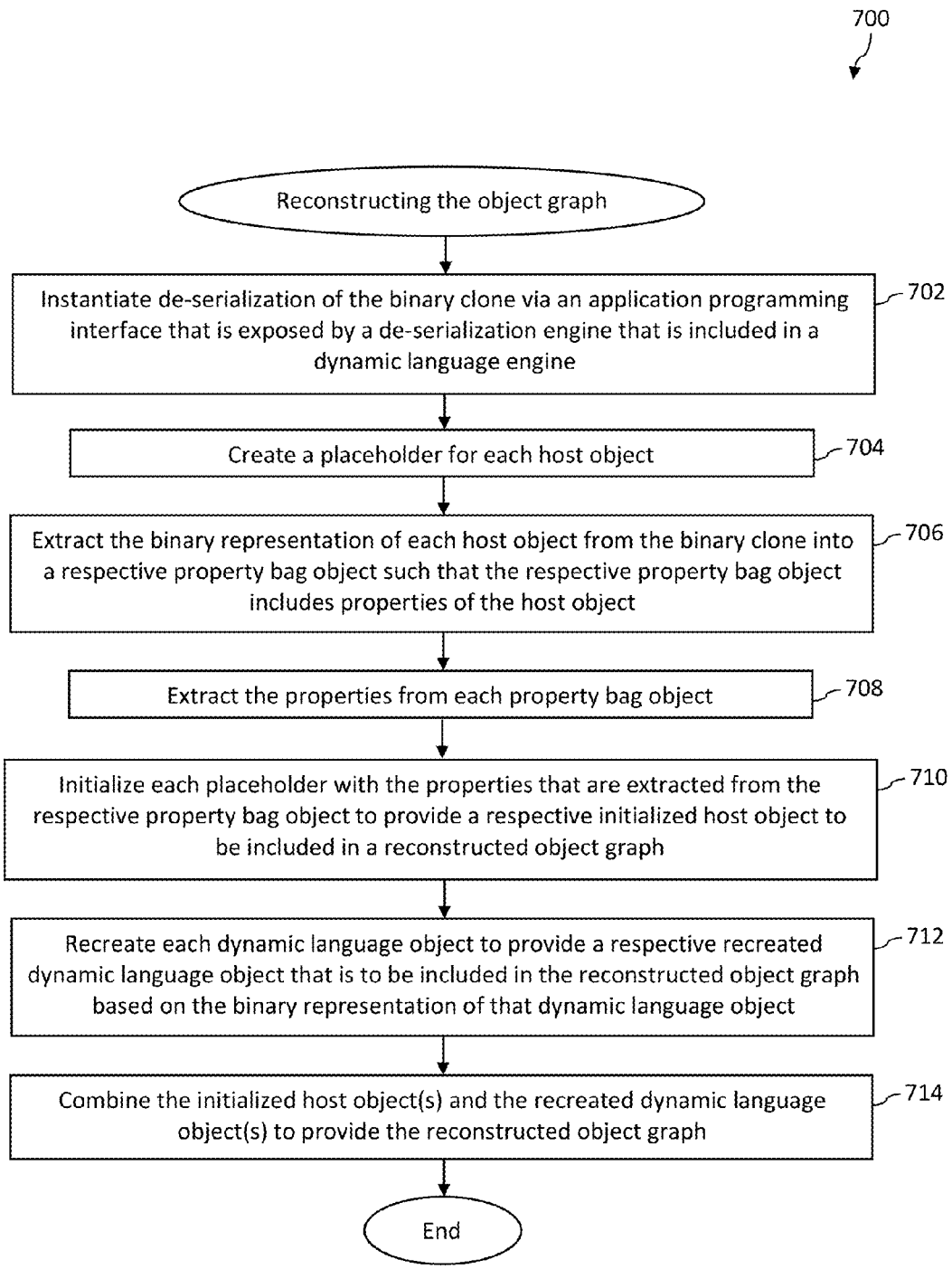
FIG. 7 depicts a flowchart of an example method for reconstructing an object graph in accordance with an embodiment.

FIGS. 6A and 6B depict respective portions of a flowchart 600 of an example method for deep cloning of objects in accordance with an embodiment. FIG. 7 depicts a flowchart 700 of an example method for reconstructing an object graph in accordance with an embodiment. Flowcharts 600 and 700 may be performed by device 100 shown in FIG. 1, for example. For illustrative purposes, flowcharts 600 and 700 are described with respect to a device 800 shown in FIG.

Figure 8:
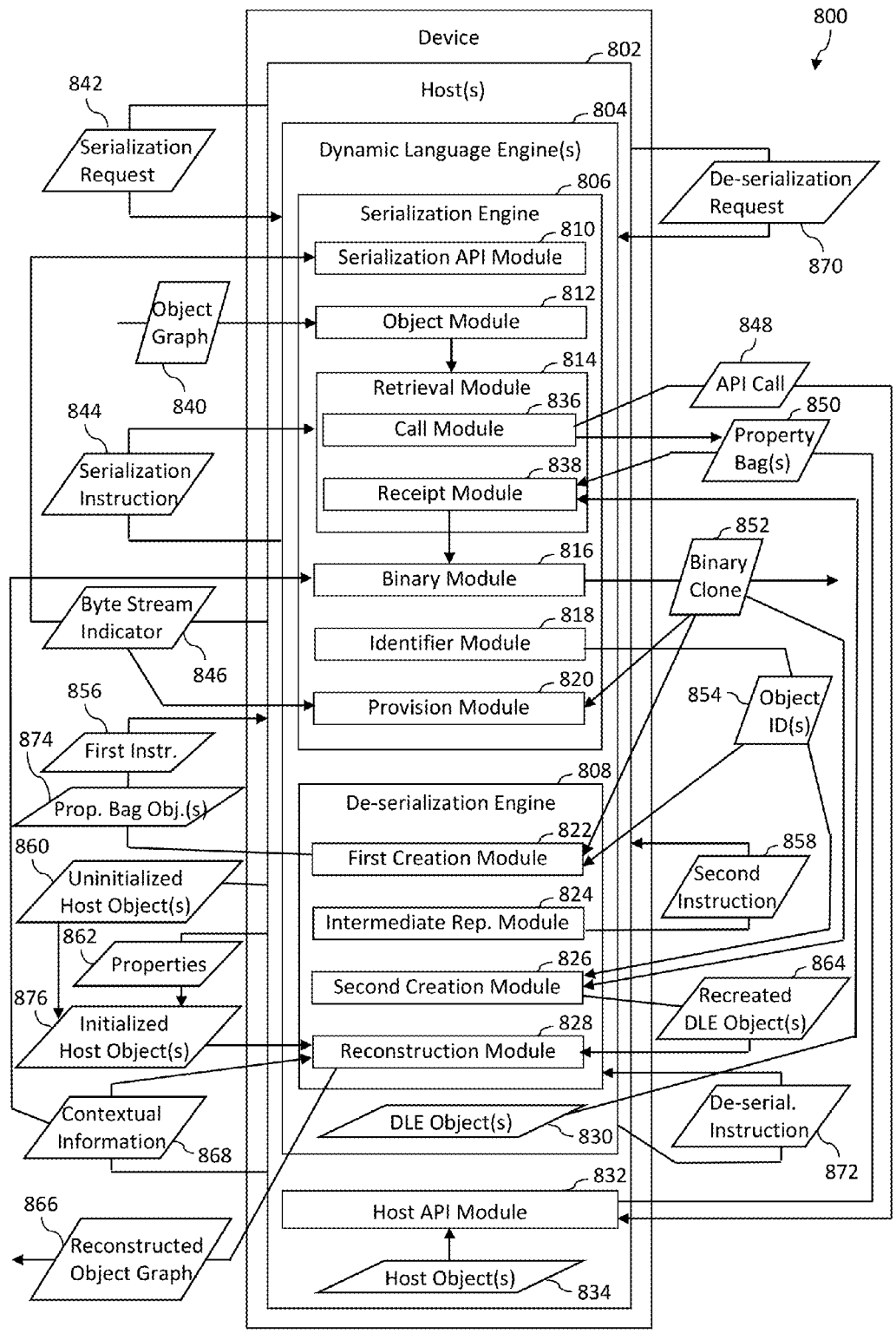

8, which is an example of a device 100, according to an embodiment. As shown in FIG. 8, device 800 executes host(s) 802. Host(s) 802 may include any number of hosts (e.g., 1, 2, 3, etc.). Host(s) 802 include host application programming interface (API) module 832 and host object(s) 834. Host(s) 802 host dynamic language engine(s) (DLE(s)) 804, which include serialization engine 806, de-serialization engine 808, and DLE object(s) 830. Serialization engine 806 includes a serialization API module 810, an object module 812, a retrieval module 814, a binary module 816, an identifier module 818, and a provision module 820. Retrieval module 814 includes a call module 836 and a receipt module 838. De-serialization engine 808 includes a first creation module 822, an intermediate representation module 824, a second creation module 826, and a reconstruction module 828. Further structural and operational embodiments will be apparent to persons skilled in the relevant art(s) based on the discussion regarding flowcharts 600 and 700.

As shown in FIG. 6A, the method of flowchart 600 begins at step 602. In step 602, serialization of an object graph is instantiated via an application programming interface that is exposed by a serialization engine included in a dynamic language engine that is hosted by a host. In an example implementation, host(s) 802 instantiates serialization of an object graph 840 via an application programming interface that is exposed by serialization API module 810 of serialization engine 806. For instance, host(s) 802 may provide a serialization request 842 to dynamic language engine(s) 804 to request that the object graph 840 be serialized. Dynamic language engine(s) 804 may provide a serialization instruction 844 to retrieval module 814 in response to dynamic language engine(s) 804 receiving the serialization request 842. The serialization instruction 844 instructs retrieval module 814 to retrieve the object(s) that are identified in the object graph 840 for serialization. In accordance with this implementation, serialization engine 806 is included in dynamic language engine(s) 804, which are hosted by host(s) 802.

In an example embodiment, the serialization of the object graph is instantiated in accordance with a call from native dynamic language code in the serialization engine. In accordance with this example, the application programming interface may be exposed to a human developer (e.g., software developer) of the dynamic language code.

At step 604, a determination is made whether a first object in the object graph is a host object or a dynamic language object. If the first object is a host object, flow continues to step 606. However, if the first object is a dynamic language object, flow continues to step 608. In an example implementation, object module 812 determines whether the first object in object graph 840 is a host object or a dynamic language object.

At step 606, a first object is retrieved from the host via an intermediate representation of the first object contained in a property bag. For instance, the intermediate representation of the first object may describe properties of the first object. In an example implementation, call module 836 creates a property bag that corresponds to the first object. The property bag is included in property bag(s) 850. Call module 836 provides an API call 848 to an application programming interface that is exposed by host API module 832. The API call 848 includes a reference to the property bag that corresponds to the first object. In accordance with this implementation, host API module 832 fills the property bag that corresponds to the first object with the properties of the first object to provide a respective filled property bag. Host API module 832 includes the filled property bag in property bag(s) 850. Receipt module 838 receives the property bag(s) 850 from host API module 832. Each property bag that is included in property bag(s) 850 may be interpretable by the dynamic language engine(s) 804 and the host(s) 802. For instance, the property bag(s) may be understandable by serialization engine 806, de-serialization engine 808, and host(s) 802.

At step 608, the first object is retrieved from the dynamic language engine. For example, the first object may be retrieved directly from the dynamic language engine. In accordance with this example, the first object may be retrieved from the dynamic language engine without making a call to an intermediate module that requests the intermediate module to perform operations for retrieving the first object. In an example implementation, retrieval module 814 retrieves the first object from dynamic language engine(s) 804. In accordance with this implementation, the first object is included in DLE object(s) 830.

At step 610, a determination is made whether the object graph includes a next object. If the object graph includes a next object, flow continues to step 612. Otherwise, flow continues to step 618, which is shown in FIG. 6B. In an example implementation, object module 812 determines whether the object graph 840 includes a next object.

At step 612, a determination is made whether the next object in the object graph is a host object or a dynamic language object. If the next object is a host object, flow continues to step 614. However, if the next object is a dynamic language object, flow continues to step 616. In an example implementation, object module 812 determines whether the next object in object graph 840 is a host object or a dynamic language object.

At step 614, a next object is retrieved from the host via an intermediate representation of the next object contained in a property bag. For instance, the intermediate representation of the next object may describe properties of the next object. In an example implementation, call module 836 creates a property bag that corresponds to the next object. The property bag is included in property bag(s) 850. Call module 836 provides an API call 848 to an application programming interface that is exposed by host API module 832. The API call 848 includes a reference to the property bag that corresponds to the next object. In accordance with this implementation, host API module 832 fills the property bag that corresponds to the next object with the properties of the next object to provide a respective filled property bag. Host API module 832 includes the filled property bag in property bag(s) 850. Receipt module 838 receives the property bag(s) 850 from host API module 832. Upon completion of step 614, flow returns to step 610.

At step 616, the next object is retrieved from the dynamic language engine. In an example implementation, retrieval module 814 retrieves the next object form dynamic language engine(s) 804. In accordance with this implementation, the next object is included in DLE object(s) 830. Upon completion of step 616, flow returns to step 610.

At step 618, an object identifier is generated by the serialization engine for each of the object(s) in the object graph. Each object identifier may include a numerical value (e.g., a unique numerical identifier) and/or a pointer to another (e.g., previous) object in the object graph. For example, an object identifier that is generated for a first object in the object graph may include a pointer to a second object in the object graph. In accordance with this example, the second object is said to be a reference object with respect to the first object. Each object identifier may include any of a variety of characteristics of the object with which it corresponds, including but not limited to an order of that object with respect to other object(s) in the object graph, a type of the object (e.g., host object or dynamic language object), etc. A type of the object may include a specified native type of host object or a specified native type of dynamic language object. The object identifier(s) may be used during de-serialization, as described in further detail below with reference to FIG. 7. In an example implementation, identifier module 818 generates object identifier(s) (shown as "object ID(s)") 854 for the respective object(s) in the object graph 840.

At step 620, a binary representation of each dynamic language object and each host object is generated in accordance with the binary format to provide a binary clone of the object graph. For example, the binary clone may be dynamic language engine agnostic. By "dynamic language engine agnostic", it is meant that the binary clone is readable (e.g., interpretable) by dynamic language engines and static language engines in addition to the dynamic language engine that includes the serialization engine used to generate the binary clone, even if the dynamic language engine that includes the aforementioned serialization engine is configured to read instructions written in a specified dynamic language and those other dynamic language engines and static language engines are not capable of reading instructions that are written in the specified dynamic language. In an example implementation, binary module 816 generates a binary representation of each dynamic language object and each host object in accordance with the binary format to provide a binary clone 852 of the object graph 840.

In an example embodiment, the binary representation(s) of the respective dynamic language object(s) and the binary representation(s) of the respective property bag(s) may include a specified (e.g., fixed) number of bits and/or bytes. For example, each of the binary representation(s) may include four bytes of data. In accordance with this example, each byte may include eight binary bits. The specified number of bits and/or bits may be predetermined (i.e., determined before serialization is instantiated), though the scope of the example embodiments is not limited in this respect.

At step 622, a byte stream indicator is received from the host at the serialization engine. The byte stream indicator specifies a designated byte stream into which the binary clone of the object graph is to be written. In an example implementation, serialization API module 810 receives a byte stream indicator 846 from host(s) 802. The byte stream indicator 846 specifies the designated byte stream into which the binary clone 852 of the object graph 840 is to be written.

At step 624, the binary clone of the object graph is written into the designated byte stream by the serialization engine based on the byte stream indicator. In an example implementation, provision module 820 writes the binary clone 852 of the object graph 840 into the designated byte stream based on the byte stream indicator 846.

It should be noted that the steps of flowchart 600 may be performed in accordance with a synchronous serialization technique or an asynchronous serialization technique. If the steps of flowchart 600 are performed in accordance with a synchronous serialization technique, steps performed by the host and steps performed by the serialization engine are performed synchronously. If the steps of flowchart 600 are performed in accordance with an asynchronous serialization technique, each of the steps performed by the host and each of the steps performed by the serialization engine may be performed synchronously or asynchronously.

In some example embodiments, one or more steps 602, 604, 606, 608, 610, 612, 614, 616, 618, 620, 622, and/or 624 of flowchart 600 may not be performed. Moreover, steps in addition to or in lieu of steps 602, 604, 606, 608, 610, 612, 614, 616, 618, 620, 622, and/or 624 may be performed. For example, the method of flowchart 600 may include receiving contextual information (e.g., contextual information 868) from the host at the serialization engine. In accordance with this example, the contextual information may specify whether serialization and de-serialization are to occur within a same dynamic language engine, within a same host, within a same device, and/or whether the binary stream is to be persisted (e.g., to a database). In further accordance with this example, at step 624 of flowchart 600, the binary clone of the object graph may be written into the designated byte stream further based on the contextual information. For instance, the serialization engine may write references to respective host objects (and not copies of the host objects) into the designated byte stream if the serialization and de-serialization are to occur with the same dynamic language engine, within the same host, and/or within the same device. This may result in serializing less data into the byte stream, which may improve performance (e.g., increase a rate at which the objects are serialized and/or de-serialized).

In another example, the method of flowchart 700 may begin upon completion of the steps shown in flowchart 600, though the scope of the example embodiments is not limited in this respect. For instance, the method of flowchart 700 may be triggered by an instruction to reconstruct the object graph. It will be recognized that an entity (e.g., a device and/or element(s) thereof) may generate an object graph based on a binary clone of the object graph, regardless whether the entity first performed steps to generate the binary clone based on the object graph As shown in FIG. 7, the method of flowchart 700 begins at step 702. In step 702, de-serialization of the binary clone is initiated via an application programming interface that is exposed by a de-serialization engine that is included in a dynamic language engine. In an example implementation, host(s) 802 instantiates de-serialization of the binary clone 852 via an application programming interface that is exposed by a de-serialization API module (not shown) of de-serialization engine 808. For instance, host(s) 802 may provide a de-serialization request 870 to dynamic language engine(s) 804 to request that the binary clone 852 be de-serialized. Dynamic language engine(s) 804 may provide a de-serialization instruction 872 to de-serialization engine 808 in response to dynamic language engine(s) 804 receiving the de-serialization request 870. The de-serialization instruction 872 instructs de-serialization engine 808 to retrieve the binary representation(s) of the object(s) in the binary clone 850 for de-serialization.

At step 704, a placeholder is created for each host object. For example, the placeholder(s) for the host object(s) may be created based on respective object identifier(s) that are generated during serialization as described above with reference to step 618 of flowchart 600. In accordance with this example, the placeholder(s) may be created based on the respective object identifier(s) indicating that the respective object(s) are host object(s). In an example implementation, first creation module 822 provides a first instruction 856 to host(s) 802 that instructs host(s) 802 to create a placeholder for each host object. In accordance with this implementation, host(s) 802 creates the placeholder for each host object. For instance, host(s) 802 may create the placeholder(s) based on the respective object identifier(s) 854 that are generated by identifier module 818. In one example, the placeholder for each host object may be implemented as a respective uninitialized host object in uninitialized host object(s) 860. In accordance with this example, host(s) 802 may provide the uninitialized host object(s) 860 to reconstruction module 828 for further processing.

At step 706, the binary representation of each host object is extracted from the binary clone into a respective property bag object such that the respective property bag object includes properties of the host object. In an example implementation, first creation module 822 extracts the binary representation of each host object from the binary clone 852 into a respective property bag object. First creation module 822 provides each property bag object to host(s) 802 for further processing, as depicted by property bag object(s) 874.

At step 708, the properties from each property bag object are extracted. In an example implementation, host(s) 802 extracts properties 862 from the property bag object(s) 874.

At step 710, each placeholder is initialized with the properties that are extracted from the respective property bag object to provide a respective initialized host object to be included in a reconstructed object graph. In an example implementation, intermediate representation module 824 provides a second instruction 858 to host(s) 802 that instructs host(s) 802 to initialize the respective placeholder(s). In accordance with this implementation, host(s) 802 initializes the placeholder(s) with the properties 862 to provide respective initialized host object(s) 876 to be included in a reconstructed object graph 866.

At step 712, each dynamic language object is recreated for inclusion in the reconstructed object graph based on the binary representation of that dynamic language object. For example, the dynamic language object(s) may be recreated based on respective object identifier(s) that are generated during serialization. In accordance with this example, the dynamic language object(s) may be recreated based on the respective object identifier(s) indicating that the respective object(s) are dynamic language object(s). In an example implementation, second creation module 826 recreates the dynamic language object(s) 803 to provide recreated DLE object(s) 864, which are to be included in the reconstructed object graph 866. For instance, second creation module 826 may recreate the dynamic language object(s) further based on the respective object identifier(s) 854 that are generated by identifier module 818.

At step 714, the initialized host object(s) and the recreated dynamic language object(s) are combined to provide the reconstructed object graph. In an example implementation, reconstruction module 828 combines the initialized host object(s) 876 and the recreated DLE objects 864 to provide the reconstructed object graph 866. It should be noted that host(s) 802 may provide references to the respective initialized host object(s) 876 to reconstruction module 828 so that reconstruction module 828 can appropriately store the initialized host object(s) 876 in the reconstructed object graph 866.

Host(s) 802 may provide the contextual information 868 to reconstruction module 828 to drive time and space optimization. For example, reconstruction module 828 may determine whether each of the initialized host object(s) and each of the recreated DLE object(s) 864 in the reconstructed object graph 866 are to be persisted in a database based on the contextual information 868. In accordance with this example, reconstruction module 828 may selectively persist the initialized host object(s) and the recreated DLE object(s) in a database in accordance with the contextual information 868.

It should be noted that the steps of flowchart 700 may be performed in accordance with a synchronous de-serialization technique or an asynchronous de-serialization technique. If the steps of flowchart 700 are performed in accordance with a synchronous de-serialization technique, steps performed by the host and steps performed by the de-serialization engine are performed synchronously. If the steps of flowchart 700 are performed in accordance with an asynchronous de-serialization technique, each of the steps performed by the host and each of the steps performed by the de-serialization engine may be performed synchronously or asynchronously.

In some example embodiments, one or more steps 702, 704, 706, 708, 710, 712, and/or 714 of flowchart 700 may not be performed. Moreover, steps in addition to or in lieu of steps 702, 704, 706, 708, 710, 712, and/or 714 may be performed.

Serialization engine 806 and de-serialization engine 808 may perform operations in addition to those described above with reference to FIGS. 6A, 6B, 7, and 8. For instance, serialization engine 806 and/or de-serialization engine 808 may be responsible for managing object identities, managing types among the object(s) in the object graph, resolving and/or preserving cycles, etc. Serialization engine 806 and de-serialization engine 808 are capable of handling primitives, built-in objects, user-defined dynamic language objects, host objects, etc. Serialization and de-serialization may be performed natively with respect to serialization engine 806 and de-serialization engine 808, respectively, using the binary format.

It will be recognized that device 800 may not include one or more of serialization engine 806, de-serialization engine 808, serialization API module 810, object module 812, retrieval module 814, binary module 816, identifier module 818, provision module 820, first creation module 822, intermediate representation module 824, second creation module 826, reconstruction module 828, DLE object(s) 830, host API module 832, host object(s) 834, call module 836, and/or receipt module 838. Furthermore, device 800 may include modules in addition to or in lieu of serialization engine 806, de-serialization engine 808, serialization API module 810, object module 812, retrieval module 814, binary module 816, identifier module 818, provision module 820, first creation module 822, intermediate representation module 824, second creation module 826, reconstruction module 828, host API module 832, call module 836, and/or receipt module 838.

Any one or more of hosts 102A-102N, any one or more of DLEs 104A-104N, any one or more of serialization engines 106A-106N, any one or more of de-serialization engines 108A-108N, serialization engine 806, de-serialization engine 808, serialization API module 810, object module 812, retrieval module 814, binary module 816, identifier module 818, provision module 820, first creation module 822, intermediate representation module 824, second creation module 826, reconstruction module 828, host API module 832, call module 836, receipt module 838, flowchart 600, and flowchart 700 may be implemented in hardware, software, firmware, or any combination thereof.

For example, any one or more of hosts 102A-102N, any one or more of DLEs 104A-104N, any one or more of serialization engines 106A-106N, any one or more of de-serialization engines 108A-108N, serialization engine 806, de-serialization engine 808, serialization API module 810, object module 812, retrieval module 814, binary module 816, identifier module 818, provision module 820, first creation module 822, intermediate representation module 824, second creation module 826, reconstruction module 828, host API module 832, call module 836, receipt module 838, flowchart 600, and/or flowchart 700 may be implemented as computer program code configured to be executed in one or more processors.

In another example, any one or more of hosts 102A-102N, any one or more of DLEs 104A-104N, any one or more of serialization engines 106A-106N, any one or more of de-serialization engines 108A-108N, serialization engine 806, de-serialization engine 808, serialization API module 810, object module 812, retrieval module 814, binary module 816, identifier module 818, provision module 820, first creation module 822, intermediate representation module 824, second creation module 826, reconstruction module 828, host API module 832, call module 836, receipt module 838, flowchart 600, and/or flowchart 700 may be implemented as hardware logic/electrical circuitry. For instance, in an embodiment, any one or more of hosts 102A-102N, any one or more of DLEs 104A-104N, any one or more of serialization engines 106A-106N, any one or more of de-serialization engines 108A-108N, serialization engine 806, de-serialization engine 808, serialization API module 810, object module 812, retrieval module 814, binary module 816, identifier module 818, provision module 820, first creation module 822, intermediate representation module 824, second creation module 826, reconstruction module 828, host API module 832, call module 836, receipt module 838, flowchart 600, and/or flowchart 700 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
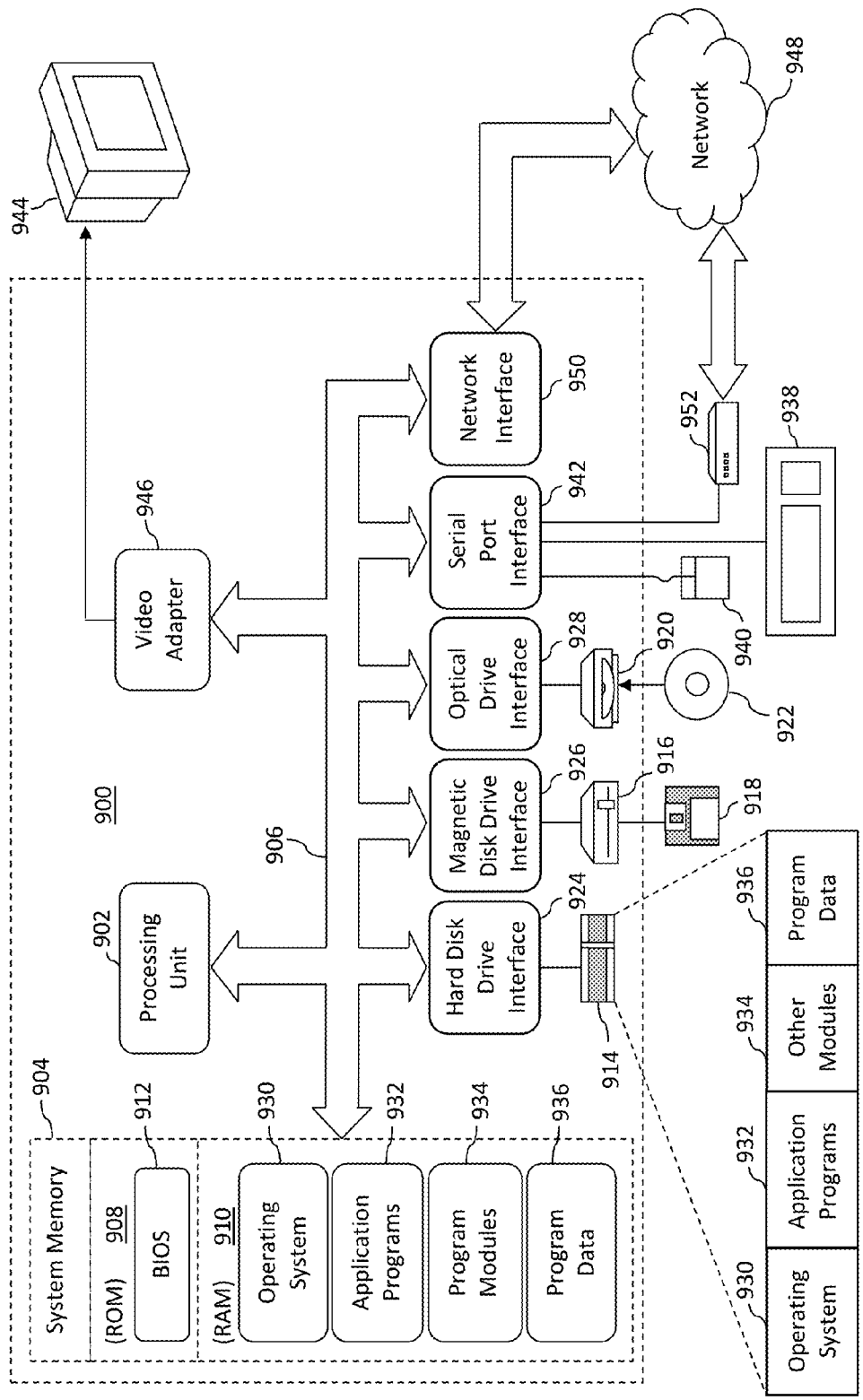
FIG. 9 depicts an example computer in which embodiments may be implemented.

FIG. 9 depicts an example computer 900 in which embodiments may be implemented. Device 100 shown in FIG. 1 (or any one or more subcomponents thereof shown in FIGS. 2-4 and 8) may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of hosts 102A-102N (e.g., operating system(s), browser(s), etc.), any one or more of DLEs 104A-104N, any one or more of serialization engines 106A-106N, any one or more of de-serialization engines 108A-108N, serialization engine 806, de-serialization engine 808, serialization API module 810, object module 812, retrieval module 814, binary module 816, identifier module 818, provision module 820, first creation module 822, intermediate representation module 824, second creation module 826, reconstruction module 828, host API module 832, call module 836, receipt module 838, flowchart 600 (including any step of flowchart 600), and/or flowchart 700 (including any step of flowchart 700), as described herein.

A user may enter commands and information into the computer 900 through input devices such as keyboard 938 and pointing device 940. Other input devices (not shown) may include a microphone, joystick, game pad, satellite dish, scanner, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable medium" are used to generally refer to media such as the hard disk associated with hard disk drive 914, removable magnetic disk 918, removable optical disk 922, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media.

Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method of deep cloning one or more objects in an object graph using a binary format performed using one or more processors of a processor-based system, the one or more objects including one or more host objects created by a host that executes on the processor-based system and that hosts a first dynamic language engine, the method comprising:
   determining how each of the one or more objects in the object graph is to be cloned based at least in part on whether that object is a host object created by the host or a dynamic language object created by the first dynamic language engine hosted by the host;
   retrieving each host object that is included in the one or more host objects, which are created by the host that executes on the processor-based system and that hosts the first dynamic language engine, from the host via an intermediate representation of that host object contained in a corresponding property bag, each intermediate representation describing properties of the corresponding host object and being understandable by the first dynamic language engine; and
   converting each host object that is included in the one or more host objects to a binary representation of the respective host object in accordance with the binary format, using at least one of the one or more processors, to provide a binary clone of the object graph.

2. The method of claim 1, further comprising:
   instantiating serialization of the object graph via an application programming interface that is exposed by a serialization engine that is included in the first dynamic language engine hosted by the host;
   receiving a byte stream indicator from the host at the serialization engine, the byte stream indicator specifying a designated byte stream into which the binary clone of the object graph is to be written; and
   writing the binary clone of the object graph into the designated byte stream by the serialization engine based on the byte stream indicator.

3. The method of claim 1, further comprising:
   instantiating serialization of the object graph via a first application programming interface that is exposed by a serialization engine that is included in the first dynamic language engine hosted by the host;
   wherein retrieving each host object comprises:
      creating the corresponding property bag by the serialization engine;
      calling a second application programming interface by the serialization engine, the second application programming interface being exposed by the host;
      sharing the corresponding property bag with the host by the serialization engine via the second application programming interface;
      generating the intermediate representation of each host object into the corresponding property bag by the host; and
      retrieving the intermediate representation for each host object that is included in the one or more host objects from the corresponding property bag by the serialization engine.

4. The method of claim 1, further comprising:
   reconstructing the object graph based on the binary clone to provide a reconstructed object graph, the reconstructing comprising:
      for the binary representation of each host object in the binary clone,
         creating a placeholder for the host object,
         extracting the binary representation of the host object from the binary clone into a respective property bag object such that the respective property bag object includes properties of the host object,
         extracting the properties from the property bag object, and
         initializing the placeholder with the properties that are extracted from the property bag object to provide a respective initialized host object in the reconstructed object graph.

5. The method of claim 4, further comprising:
   instantiating serialization of the object graph via an application programming interface that is exposed by a serialization engine that is included in the first dynamic language engine hosted by the host;
   wherein, for the binary representation of each host object in the binary clone, creating the placeholder for the host object comprises:
      creating the placeholder for the host object by a second host that is different from the first host from which the property bag for each host object that is included in the one or more host objects is retrieved;
   wherein, for the binary representation of each host object in the binary clone, extracting the binary representation of the host object comprises:
      extracting the binary representation of the host object from the binary clone into the respective property bag object by a de-serialization engine that is included in a second dynamic language engine that is hosted by the second host;

wherein, for the binary representation of each host object in the binary clone, extracting the properties from the property bag object comprises:
   extracting the properties from the property bag object by the second host; and
wherein, for the binary representation of each host object in the binary clone, initializing the placeholder comprises:
   initializing the placeholder by the second host.

6. The method of claim 5, wherein the one or more objects further include one or more dynamic language objects created by the first dynamic language engine; and
   wherein the method further comprises:
      retrieving each dynamic language object that is included in the one or more dynamic language objects from the first dynamic language engine configured to execute commands written in a first dynamic language; and
      recreating each dynamic language object that is included in the one or more dynamic language objects in the reconstructed object graph using the second dynamic language engine configured to execute commands written in a second dynamic language.

7. The method of claim 4, further comprising:
instantiating serialization of the object graph via an application programming interface that is exposed by a serialization engine that is included in the first dynamic language engine hosted by the host;
wherein, for the binary representation of each host object in the binary clone, creating the placeholder for the host object comprises:
   creating the placeholder for the host object by the host;
wherein, for the binary representation of each host object in the binary clone, extracting the binary representation of the host object comprises:
   extracting the binary representation of the host object from the binary clone into the respective property bag object by a de-serialization engine that is included in a second dynamic language engine that is hosted by the host and that is different from the first dynamic language engine;
wherein, for the binary representation of each host object in the binary clone, extracting the properties from the property bag object comprises:
   extracting the properties from the property bag object by the host; and
wherein, for the binary representation of each host object in the binary clone, initializing the placeholder comprises:
   initializing the placeholder by the host.

8. The method of claim 7, wherein the one or more objects further include one or more dynamic language objects created by the first dynamic language engine; and
   wherein the method further comprises:
      retrieving each dynamic language object that is included in the one or more dynamic language objects from the first dynamic language engine configured to execute commands written in a first dynamic language; and
      recreating each dynamic language object that is included in the one or more dynamic language objects in the reconstructed object graph using the second dynamic language engine configured to execute commands written in a second dynamic language.

9. The method of claim 1, wherein converting each host object that is included in the one or more host objects comprises:
   converting each host object that is included in the one or more host objects to the binary representation of the respective host object that includes a reference to each object that is included in the host object and a copy of each object that is included in the host object.

10. The method of claim 1, wherein converting each host object that is included in the one or more host objects comprises:
   converting each host object that is included in the one or more host objects to the binary representation of the respective host object that includes a reference to each object that is included in the host object; and
   wherein at least a first binary representation of a first host object does not include a copy of each object that is included in the first host object.

11. The method of claim 1, wherein converting each host object that is included in the one or more host objects comprises:
   converting each host object that is included in the one or more host objects to the binary representation of the respective host object in accordance with the binary format to provide the binary clone that is dynamic language engine agnostic.

12. A system comprising:
at least one element including at least one of (a) one or more processors, (b) hardware logic, or (c) electrical circuitry; and
one or more hosts, implemented using the at least one element, configured to deep clone one or more objects in an object graph using a binary format, the one or more objects including one or more host objects created by at least one of the one or more hosts, the one or more hosts hosting one or more dynamic language engines, the one or more dynamic language engines comprising:
   an object module configured to determine how each of the one or more objects in the object graph is to be cloned based at least in part on whether that object is a host object created by at least one of the one or more hosts or a dynamic language object created by at least one of the one or more dynamic language engines hosted by the one or more hosts;
   a retrieval module configured to retrieve each host object that is included in the one or more host objects from at least one first host of the one or more hosts via an intermediate representation of that host object contained in a corresponding property bag, each intermediate representation describing properties of the corresponding host object and being understandable by at least one of the one or more dynamic language engines, and
   a binary module configured to convert each host object that is included in the one or more host objects to a binary representation of the respective host object in accordance with the binary format to provide a binary clone of the object graph.

13. The system of claim 12, wherein the one or more dynamic language engines comprise:
   a serialization engine configured to expose an application programming interface;
   wherein at least one of the one or more hosts is configured to instantiate serialization of the object graph via the application programming interface that is exposed by the serialization engine; and wherein the serialization engine is further configured to write the binary clone of the object graph into a designated byte stream based on a byte stream indicator that is received from at least one of the one or more hosts, the byte stream indicator specifying the designated byte stream into which the binary clone of the object graph is to be written.

14. The system of claim 12, wherein the one or more dynamic language engines comprise:
a serialization engine configured to expose one or more application programming interfaces;
wherein at least one of the one or more hosts is configured to instantiate serialization of the object graph via a first application programming interface that is exposed by the serialization engine;
wherein the retrieval module comprises:
a call module configured to create the corresponding property bag, the call module further configured to call a second application programming interface that is exposed by at least one of the one or more hosts;
wherein the serialization engine is configured to share the corresponding property bag with at least one of the one or more hosts via the second application programming interface;
wherein at least one of the one or more hosts is configured to generate the intermediate representation of each host object into the corresponding property bag; and
wherein the retrieval module is configured to retrieve the intermediate representation for each host object that is included in the one or more host objects from the corresponding property bag.

15. The system of claim 12, wherein the one or more hosts are configured to reconstruct the object graph based on the binary clone to provide a reconstructed object graph; and
wherein the one or more dynamic language engines further comprise:
a first creation module configured to, for the binary representation of each host object in the binary clone, provide an instruction to at least one host of the one or more hosts that causes the at least one host to create a placeholder for the host object,
the first creation module further configured to, for the binary representation of each host object in the binary clone, extract the binary representation of the host object from the binary clone into a respective property bag object such that the respective property bag object includes properties of the host object; and
an intermediate representation module configured to, for the binary representation of each host object in the binary clone, initialize the placeholder with the properties that are extracted from the property bag object by at least one of the one or more hosts to provide a respective initialized host object in the reconstructed object graph.

16. The system of claim 15, wherein the one or more dynamic language engines comprise:
a serialization engine configured to expose one or more application programming interfaces;
wherein at least one of the one or more hosts is configured to instantiate serialization of the object graph via an application programming interface that is exposed by the serialization engine;
wherein at least one second host of the one or more hosts is configured to, for the binary representation of each host object in the binary clone, create the placeholder for the host object, the at least one second host being different from the at least one first host from which the property bag for each host object that is included in the one or more host objects is retrieved;
wherein the at least one second host hosts a second dynamic language engine of the one or more dynamic language engines, the second dynamic language engine comprising:
a de-serialization engine configured to, for the binary representation of each host object in the binary clone, extract the binary representation of the host object from the binary clone into the respective property bag object;
wherein the at least one second host is configured to, for the binary representation of each host object in the binary clone, extract the properties from the property bag object; and
wherein the at least one second host is configured to, for the binary representation of each host object in the binary clone, initialize the placeholder.

17. The system of claim 16, wherein the one or more objects further include one or more dynamic language objects created by a first dynamic language engine of the one or more dynamic language engines, the first dynamic language engine including the serialization engine, the serialization engine including the retrieval module and the binary module;
wherein the first dynamic language engine is configured to execute commands written in a first dynamic language; and
wherein the one or more dynamic language engines further comprise:
a second dynamic language engine configured to recreate each dynamic language object that is included in the one or more dynamic language objects in the reconstructed object graph, the second dynamic language engine configured to execute commands written in a second dynamic language.

18. The system of claim 15, wherein the one or more dynamic language engines comprise:
a serialization engine configured to expose one or more application programming interfaces;
wherein at least one of the one or more hosts is configured to instantiate serialization of the object graph via an application programming interface that is exposed by the serialization engine; and
wherein the one or more dynamic language engines comprise:
a first dynamic language engine that includes the serialization engine, the serialization engine including the retrieval module and the binary module; and
a second dynamic language engine that includes a de-serialization engine, the de-serialization engine including the first creation module and the intermediate representation module, the second dynamic language engine being different from the first dynamic language engine.

19. The system of claim 18, wherein the one or more objects further include one or more dynamic language objects created by the first dynamic language engine;
wherein the first dynamic language engine is configured to execute commands written in a first dynamic language; and
wherein the second dynamic language engine is configured to recreate each dynamic language object that is included in the one or more dynamic language objects in the reconstructed object graph, the second dynamic language engine configured to execute commands written in a second dynamic language.

20. The system of claim 12, wherein the binary representation of each host object includes a reference to each object that is included in the host object and a copy of each object that is included in the host object.

21. The system of claim 12, wherein the binary representation of each host object includes a reference to each object that is included in the host object; and
wherein at least a first binary representation of a first host object does not include a copy of each object that is included in the first host object.

22. The system of claim 12, wherein the binary clone of the object graph is dynamic language engine agnostic.

23. A method performed using one or more processors of a processor-based system, the method comprising:
converting a binary clone of an object graph to a reconstruction of the object graph, the binary clone including one or more binary representations of one or more respective host objects, the converting comprising:
for each of the one or more binary representations of the one or more respective host objects,
extracting, using at least one of the one or more processors, the binary representation of the respective host object from the binary clone into a respective property bag object that includes an intermediate representation of the host object such that the intermediate representation includes properties of the host object, the property bag object is understandable by a dynamic language engine, and
initializing a placeholder for the host object with the properties, which are extracted from the intermediate representation, to provide a respective initialized host object in the reconstruction of the object graph.

24. The method of claim 23, wherein the binary clone further includes one or more binary representations of one or more respective dynamic language objects; and
wherein the method further comprises:
recreating each of the one or more dynamic language objects in the object graph based on the binary representation of that dynamic language object in the binary clone.

25. The method of claim 23, further comprising:
instantiating de-serialization of the binary clone via an application programming interface that is exposed by a de-serialization engine that is included in a dynamic language engine;
wherein, for the binary representation of each host object in the binary clone, extracting the binary representation of the host object comprises:
extracting the binary representation of the host object from the binary clone into the respective property bag object by a de-serialization engine that is included in the dynamic language engine; and wherein initializing the placeholder comprises:
initializing the placeholder by a host that hosts the dynamic language engine.

26. A system comprising:
at least one element including at least one of (a) one or more processors, (b) hardware logic, or (c) electrical circuitry;
one or more hosts, implemented using the at least one element, configured to convert a binary clone of an object graph to a reconstruction of the object graph, the binary clone including one or more binary representations of one or more respective host objects, the one or more hosts hosting one or more dynamic language engines, the one or more dynamic language engines comprising:
a creation module configured to, for each of the one or more binary representations of the one or more respective host objects, extract the binary representation of the respective host object from the binary clone into a respective property bag object that includes an intermediate representation of the host object such that the intermediate representation includes properties of the host object, the property bag object is understandable by at least one of the one or more dynamic language engines; and
an intermediate representation module configured to, for each of the one or more binary representations of the one or more respective host objects, provide an instruction to at least one host of the one or more hosts that causes the at least one host to initialize a placeholder for the host object with the properties of the host object, which are extracted from the respective intermediate representation, to provide a respective initialized host object in the reconstruction of the object graph.

27. The system of claim 26, wherein the binary clone further includes one or more binary representations of one or more respective dynamic language objects; and
wherein the one or more dynamic language engines further comprise:
a second creation module configured to recreate each of the one or more dynamic language objects in the object graph based on the binary representation of that dynamic language object in the binary clone.

28. The system of claim 26, wherein at least one of the one or more hosts is configured to instantiate de-serialization of the binary clone via an application programming interface that is exposed by a de-serialization engine that is included in the one or more dynamic language engines that are hosted by the host;
wherein the de-serialization engine includes the creation module; and
wherein at least one of the one or more hosts is configured to, for each of the one or more host objects, initialize the placeholder for the host object with the properties of the host object.

* * * * *